US005739764A

United States Patent [19]

Ide et al.

[11] Patent Number: 5,739,764

[45] Date of Patent: Apr. 14, 1998

[54] SELECTIVE CALLING RECEIVER HAVING AN ALERTING TIME AUTO-CONTROL FUNCTION

[75] Inventors: Motoki Ide, Tokyo; Yasuyuki Mochizuki, Shizuoka, both of Japan

[73] Assignee: NEC Corporation, Tokyo, Japan

[21] Appl. No.: 364,457

[22] Filed: Dec. 27, 1994

[30] Foreign Application Priority Data

Dec. 28, 1993 [JP] Japan .................................. 5-336923

[51] Int. Cl.$^6$ .................................. H04Q 7/18

[52] U.S. Cl. .................. 340/825.44; 455/426; 340/311.1; 340/825.69; 370/312; 370/313

[58] Field of Search .................................. 455/186.1, 426; 340/311.1, 825.44, 825.47, 825.68, 825.69; 379/56; 370/310, 312, 313, 314

[56] References Cited

U.S. PATENT DOCUMENTS

| | | | |
|---|---|---|---|
| 4,385,295 | 5/1983 | Willard et al. | 340/825.44 |
| 4,872,005 | 10/1989 | DeLuca et al. | 340/825.44 |
| 4,894,649 | 1/1990 | Davis | 340/825.22 X |
| 4,949,085 | 8/1990 | Fisch et al. | 340/825.44 |
| 4,965,569 | 10/1990 | Bennett et al. | 340/825.44 |
| 5,012,219 | 4/1991 | Henry | 340/825.44 X |
| 5,252,963 | 10/1993 | Snowden et al. | 340/825.44 |
| 5,434,563 | 7/1995 | Kudoh | 340/825.37 X |
| 5,448,228 | 9/1995 | Wagai et al. | 340/825.37 X |

FOREIGN PATENT DOCUMENTS 4-264828 9/1992 Japan .

*Primary Examiner*—Michael Horabik

*Assistant Examiner*—William H. Wilson, Jr.

*Attorney, Agent, or Firm*—Sughrue, Mion, Zinn, Macpeak & Seas, PLLC

[57] ABSTRACT

A selective calling receiver having an alarting time auto-control function according to the present invention includes a first storing circuit for storing an identification number. A decoder for detecting a coincidence of a call signal contained in the received signal and the identification number, and for outputting a coincidence signal, and for decoding a message signal contained in the received signal, and for outputting a message. An alarting section for inputting the coincidence signal and alarting. A display section for displaying the message. A second storing circuit for storing an none-read message and a read out message. A reset switch for being operated by a user when he notices the alerting, and for outputting a reset signal. A calculating circuit for calculating an alerting time based on the number of the non-read messages. A counting circuit for counting the alerting time, and for outputting a count up signal when the alerting time is counted up. An alerting stopping circuit for inputting the reset signal or the count up signal, and making the alerting and displaying stop. A rewrite circuit for outputting the message as an non-read message upon receiving the count up signal to the second memory, and for outputting the message as a read out message upon receiving the reset signal to the second memory means.

25 Claims, 7 Drawing Sheets

SELECTIVE CALLING RECEIVER HAVING AN ALERTING TIME AUTO-CONTROL FUNCTION

BACKGROUND OF THE INVENTION

The present invention relates to a selective calling receiver (hereinafter, referred to as a receiver) having an alerting time (hereinafter, referred to as a call information time) auto-control function, which automatically steps the call information when a stoppage of the call information is not ordered after the passage of a predetermined period of time after receipt of the call information.

Conventionally, this kind of the receiver alerts a user thereof by means of sound made by a speaker, the vibration of a vibrator, or a flashing of an LED, when an identification number (hereinafter referred to as ID) coincides with a call signal contained in a radio signal transmitted from a base station.

The receiver stops the call information when the user acknowledges the call information by operating a switch.

However, when the user fails to acknowledge the call information fails to operate the switch, the receiver continues to produce the call information, and the life time of the battery is shortened as a result.

To solve the above drawback, the conventional receiver has an auto-reset function, which stops automatically the call information after the passage of a predetermined period from the time of the call information is received even though the user fails to operate the switch.

The conventional receiver has both an auto-reset function and a manual reset function which stop the call information only by the operation of the switch by the user, and the user can select any one of both functions.

The above-mentioned receiver has been known, for example, in Japanese Patent Application Laid-open Heisei 4-264828, published on Sep. 21, 1992 (hereinafter, referred to as a reference 1).

Reference 1 describes the receiver having the call information time auto-control function and the manual reset function. Further, the receiver has a plurality of call information means, i.e., the sound of a speaker, the vibration of a vibrator, or a flashing LED.

However, the receiver reference 1 encounters the problem that even if the auto-reset function is selected, the time elapsed until the call information is stopped is not changed whether the user carries the receiver or not.

Specifically, in the case where the user does not carry the receiver if the time until the call information is stopped automatically is set to be long, the life time of a battery is shortened by the time difference compared to the case of where the elapsed time until the call information is stopped, is set to be short.

On the other hand, even if the user carries the receiver, if the elapsed time until the call information is stopped automatically is set to be short, a probability that the user will notice the call information is made low compared to the case where the elapsed time until the call information is stopped, is set to be long.

SUMMARY OF THE INVENTION

An object of the present invention is to provide a selective calling receiver having an alerting time auto-control function which can automatically set an appropriate alerting time depending on whether the user carrier the receiver or not.

Another object of the present invention is to provide a selective calling receiver having an alerting time auto-control function which sets the time for initiating an auto-reset based on the number of non-read messages, when the user fails to notice calls.

To achieve the above objects, a selective calling receiver having an alarting time auto-control function of the present invention comprises an antenna and a demodulation circuit for demodulating and amplifying the received signal by the antenna and for outputting the demodulated signal. A wave shaping circuit shapes the demodulated signal and outputs a digital signal, A first storing circuit stores an ID-number. A decoder detects a coincidence of a call signal contained in the digital signal and the ID number to output a coincidence signal and decodes a message signal contained in the digital signal to output a message. An alerting section inputs the coincidence signal to excute call information, A display section displays the message. A second storing circuit stores a non-read message and a read out message. A reset switch is operated by the user of the receiver when they notice the call information and the switch outputs a reset signal. A calculating circuit calculates an alerting time based on the number of the non-read messages. A timing circuit counts call information time calculated by the calculating circuit and outputs a count up signal when the call information time is counted up. A call information stopping circuit inputs the reset signal or the count up signal to make the alerting section stop executing the call information and the display section stop a displaying the message. A rewrite circuit outputs the-message as a non-read message upon receiving the count up signal and outputs the message as a read out message upon receiving the reset signal to the second memory circuit.

By adopting the above construction, the receiver of the present invention sets the call information alerting time, based on the number of the non-read messages. As a result, when the user does not carry the receiver, the receiver automatically sets a shortened time of call information compared with the time of call information alerting when the user carries the receiver.

BRIEF DESCRIPTION OF THE DRAWINGS

These and other objects, features and advantages of the invention will become more fully apparent from the following detailed description taken in conjunction with the accompanying drawings.

DETAILED DESCRIPTION OF THE PREFERRED EMBODIMENTS

Figure 1:
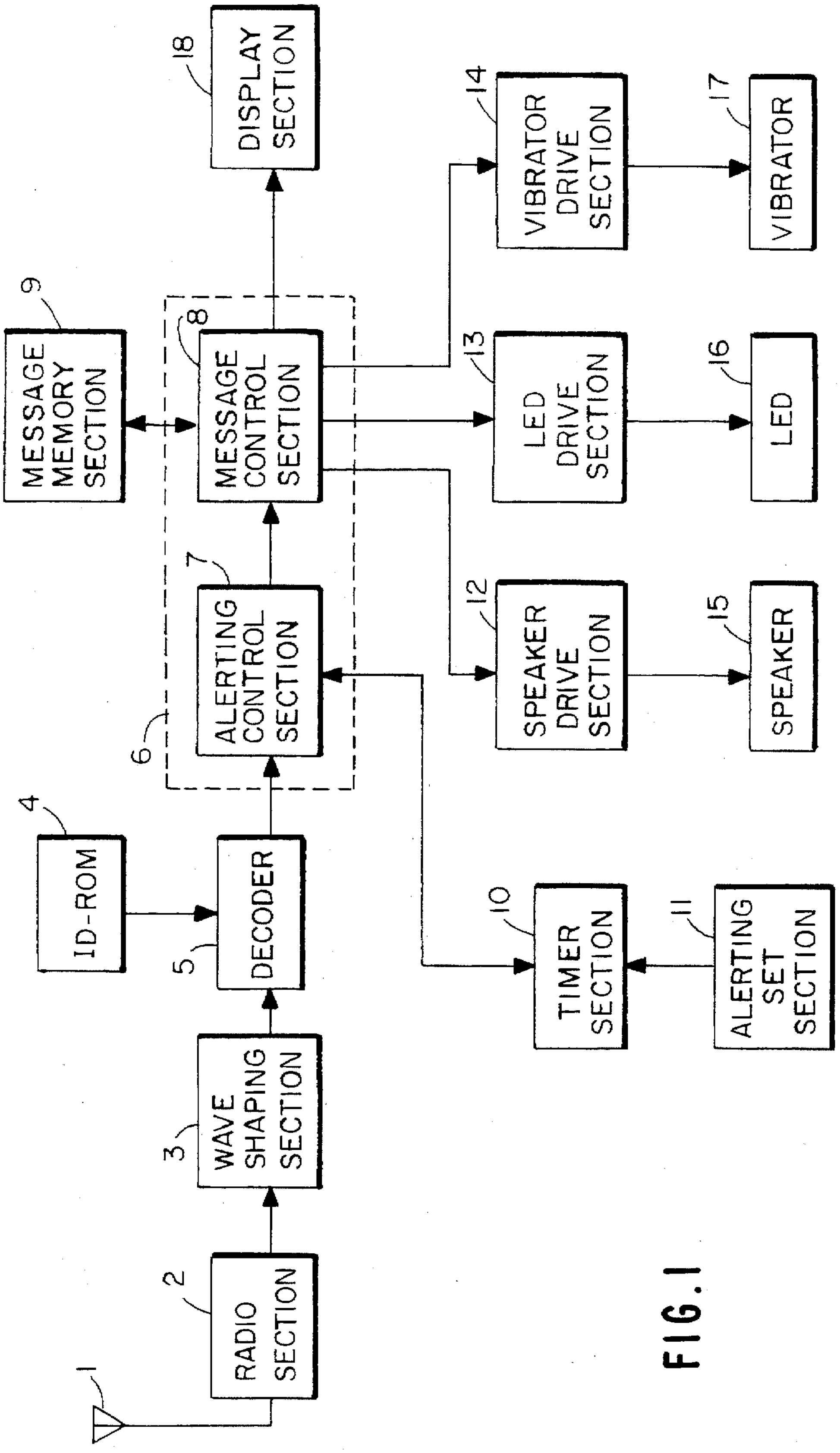
FIG. 1 is a functional block diagram showing the preferred embodiment of a selective calling receiver having a call information time auto-control function according to the present invention.

In FIG. 1, an antenna 1 receives a radio signal from a radio base station (not shown) to output the received radio signal to a radio section 2. The radio section 2 modulates and amplifies the received radio signal to output a modulated signal to a wave shaping section 3. The wave shaping section 3 shapes wave forms of the modulated signal so that the modulated signal is converted to a digital signal to be read out by a decoder 5. The digital signal is outputted to the decoder 5.

An ID-ROM 4 is constituted of a Programmable Read Only Memory (hereinafter, referred to as a P-ROM), which stores a previously prescribed ID number of the receiver. The decoder 3 compares the call signal contained in the digital signal with the ID-number read out from the ID-ROM 4. When the call signal and the ID-number coincide with each other, an ID coincidence signal is outputted to an alerting control section 7 (hereinafter referred to as a call information control section). In addition, when the decoder 3 detects the coincidence of the call signal with the ID number, the decoder 3 decodes a message signal followed by the call signal to output the message signal through the call information control section 7 to a message control section 8.

A control section 6 is constituted of a widely used microprocessor, and includes the call information control section 7 and the message control section 8.

When the call information control section 7 is supplied with the ID coincidence signal, the section 7 detects an alerting means (hereinafter referred to as a call information means) set by an alerting means set section 19 (hereinafter referred to as a call means set section) constituting an alerting set section 11 (hereinafter referred to as a call information set section). The call information control section 7 detects a speaker 15 to output a speaker detection signal. In the same manner, the control section 7 outputs an LED detection signal and a vibrator detection signal to the message control section 8.

The call information section 7 detects a manual reset signal or an auto-reset signal which the reset mode setting section constituting the call information setting section 11 produces.

When the call information control section 7 detects an auto-reset signal, the control section 7 demands the message control section 8 to output the data representing the number of non-read messages received. The call information control section 7 calculates equation (described later) to decide a call information time based on the number of non-read messages received. The control section 7 outputs a call information time as a timer set signal to a timer section 10.

Hereinafter, a non-read message will be described. The non-read message is made in the following situation. When a reset mode setting section 20 is set to auto-reset function, a user of the receiver falls to notice a call. In this mode, the calling information is stopped before the user operates a manual reset section 21. Specifically, the non-read message is the message which is sent by function corresponding to a count up of the timer section The call information control section 7 output a reset signal to the timer section 10 in response to an input of either a count up signal or a manual reset signal.

Figure 2:
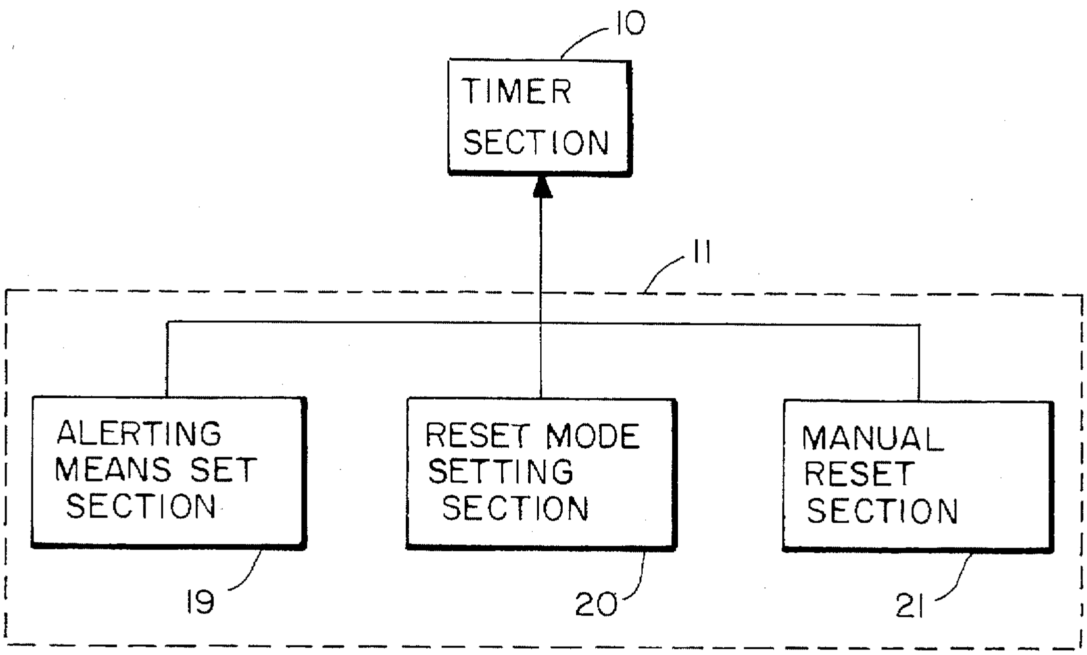
FIG. 2 is a detailed block diagram illustrating an alarting set section shown in FIG. 1.

As shown in FIG. 2, the call information set section 11 is composed of a call alerting means set section 19, the reset mode setting section 20, and the manual reset section 21, each is capable of being formed of a push type button or a slide switch.

The call means set section 19 triggers any one of calling information means consisting of the sound of the speaker 15, flashing and turning on of an LED 19, and vibration of the vibrator 17.

The reset mode setting section 20 sets any one of reset modes consisting of a manual reset mode and an auto reset mode, and outputs a manual reset mode signal and an auto reset mode signal to the call information control section 7.

The manual reset section 21 is operated when the user of the receiver is aware of being called forth, and at this time, the manual reset section 21 outputs the manual reset signal to the call information control section 7.

Returning to FIG. 1, the timer section 10 consists of a well-known circuit having a time constant circuit, and a call information time duration is set by a timer set signal output from the call information control section 7. The timer section 10 outputs a count up signal at the counting up of the call information time to the call information control section 7. The timer section 10 is reset by the reset signal from the call information control section 7.

The message memory 8 consisting of a S-RAM (Static Random Access Memory), outputs a message stored therein to the message control section 8, and stores a message output from the message control section 8.

The message control section 8 constituting the control section 6 is supplied with a message from the decoder 5 through the call information control section 7 to store temporarily in a register thereof.

The message control section 8 receives any one of a speaker detection signal, an LED detection signal, and a vibrator detection signal to output an information drive control signal to the information drive section corresponding to each of these signals. Further, the message control section 8 outputs a message stored in the register to a display section 18.

The message control section 8 detects the non-read message stored in the message memory section 9 according to a demand for outputting the data representing the number of non-read messages received from the call information control section 7. The message control section 8 compares the detected non-read message with the message stored in the register, and when the non-read message coinciding with the message stored in the register is found, section 8 outputs the data representing the number of non-read messages received to the call information control section 7. Hereinafter, the non-read out message coinciding with the message stored in the register is called re-receiving non-read message.

In order to understand a detection for the number of times of the unread out message receiving, the method of storing the message in the message memory section 9 will be described below.

A message obtained by decoding a message signal has three bits added to its starting bit in the control section 3. Specifically, among the added three bits, the most significant bit (M S B) is for discriminating a non-read message and a read out message. In the case of a read out message, a logical state "0" is set, and in the case of a non-read message, a logical state "1" is set. The following second and third bits are for representing the number of times the non-read message is received. The number of times the non-read message is received can be represented by four kinds of combinations of the second and third bits.

The message control section 8 receives either the count up signal or the manual reset signal to stop an output of an information drive control signal and the message.

When a re-receiving non-read message exists and the manual reset signal is supplied to the message control section 8, the message control section 8 rewrites the logical state of the starting bit of the re-receiving non-read message from 1 to 0. The message control section 8 regards logical state "0" as a read out message to allow the message memory section 9 to store the read out message.

When the re-receiving non-read message exists and a count-up signal is supplied to the message control section 8, the message control section 8 increments the number of times the non-read message is received by one, represented by the second and third bits of the re-receiving non-read message, and allows the message memory section 9 to store the number of times the non-read message was received.

When the re-receiving non-read out message does not exist and the manual reset signal is supplied to the message control section 8, the message control section 8 adds one bit, logical state "0", to the starting bit of the re-receiving non-read message stored in the register as the read out message to allow the message memory section 9 to store the read out message.

When the re-receiving non-read out message does not exist and the count-up signal is supplied to the message control section 8, the message control section 8 adds the logical state "1" to the starting bit of the message stored in the register, the logic "0" to the second bit thereof, and the logic "1" to the third bit thereof, respectively. The message control section 8 regards the combination of these logics as the first received non-read message to allow the message memory section 9 to store the non-read message.

The speaker drive section 12 amplifies the information drive control signal outputted from the call information control section 7 to output to the speaker 15.

The LED drive section 13 boosts up a voltage of the information drive control signal outputted from the call information section 7 to output to the LED 16.

The vibrator drive section 14 boosts up a voltage of the information drive control signal outputted from the call information section 7, and inputting the information drive control signal to the vibrator 17.

The display section 18 displays the message outputted from the message control section 8.

Figure 3:
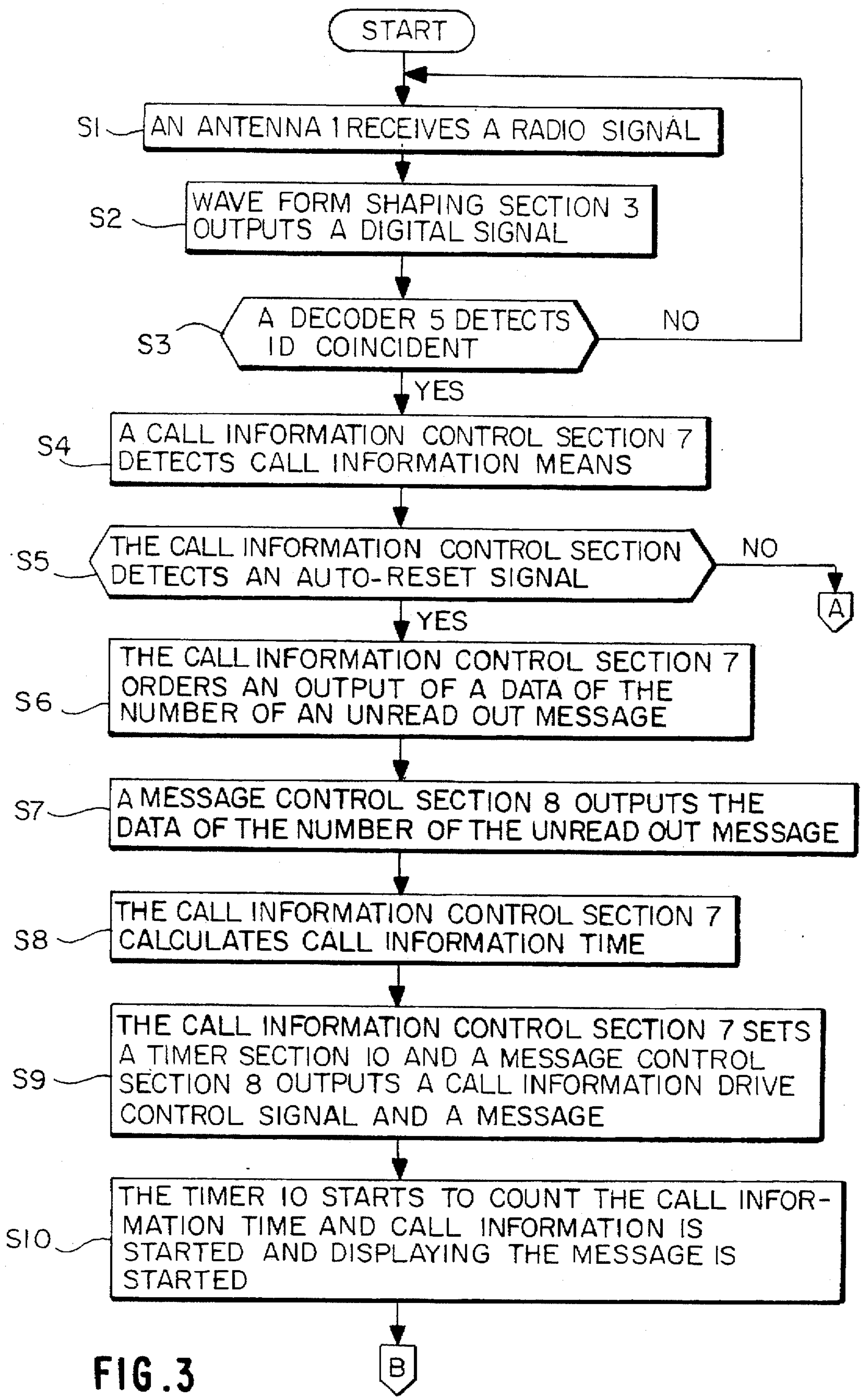
FIGS. 3, 4, and 5 are a flow chart for illustrating an operation of a first embodiment.
Figure 4:
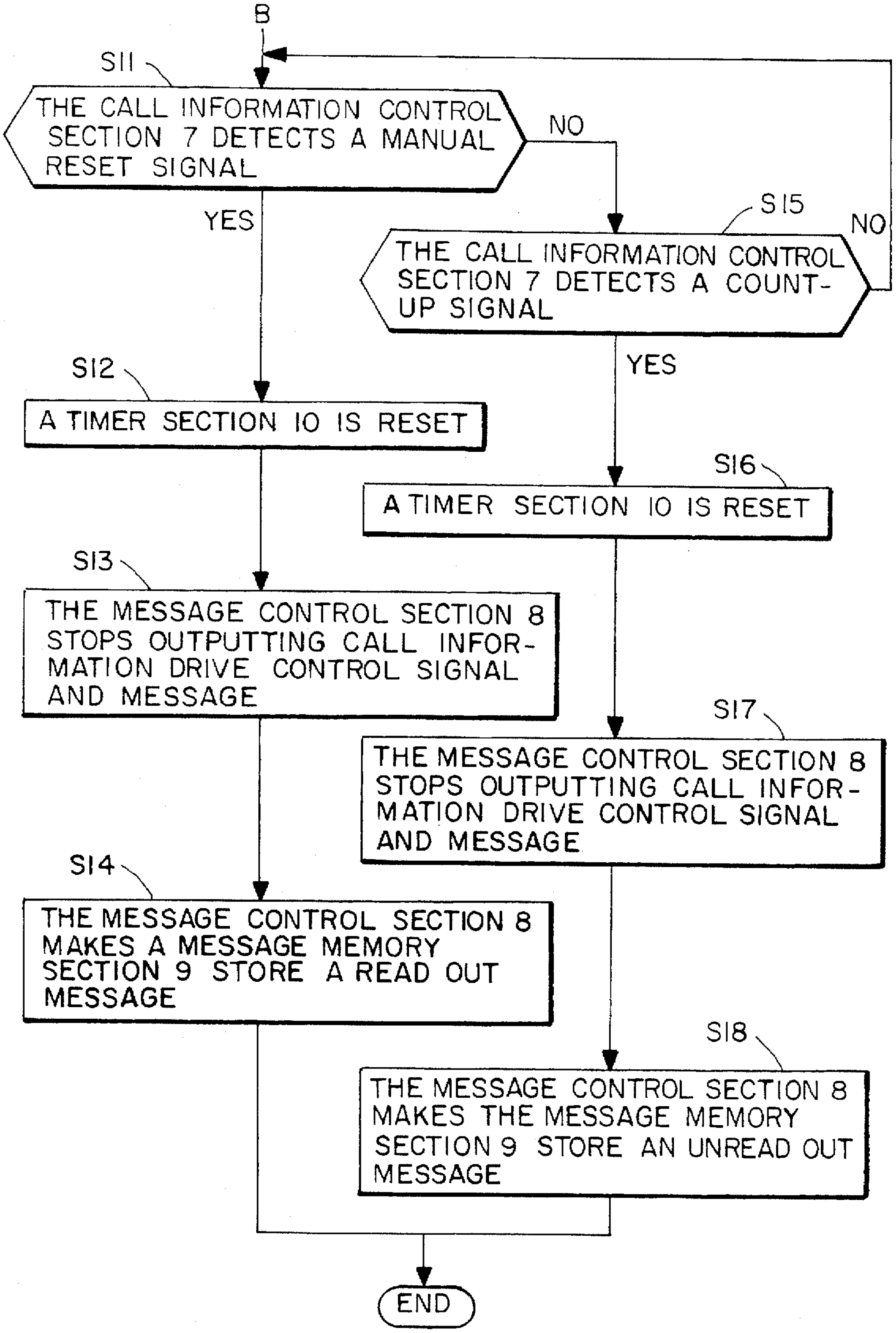
Figure 5:
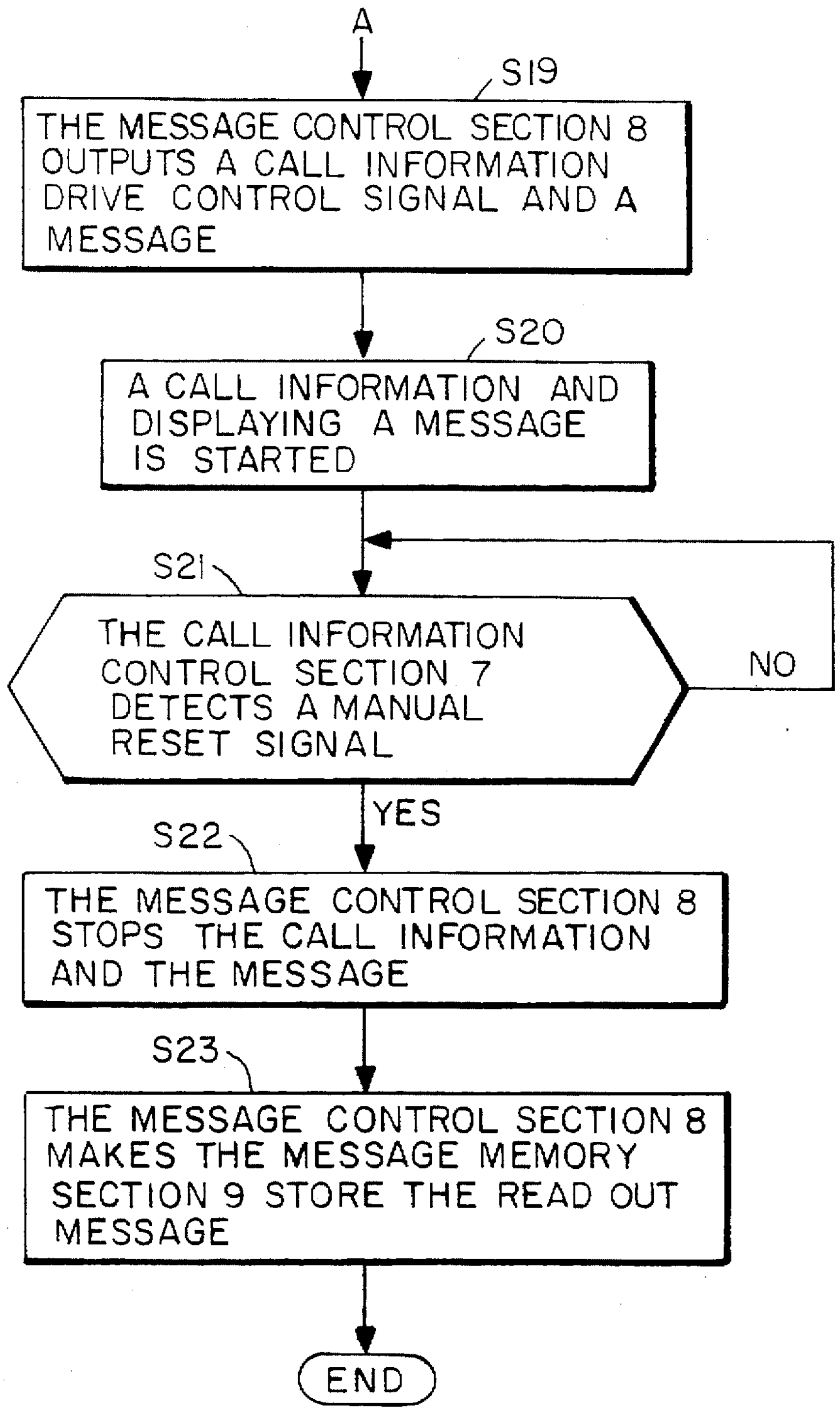

Next, an operation of the receiver of the present invention will be described with reference to FIGS. 3, 4 and 5.

To begin with, the antenna 1 receives the radio signal from the radio base station (S 1), the received signal is converted to a digital signal via the radio section 2 and the wave form shaping section 3 to be input to the decoder 5 (S 2). The decoder 5 compares the call signal contained in the digital signal with the ID-signal, detects the coincidence of them and to produce an ID coincidence signal to the call information control section 7 (S 3). The decoder 5 decodes a message signal contained in the digital signal to output the message to the message control section 8 via the call information control section 7.

Upon receiving the ID coincidence signal, the call information control section 7 detects the call information means set by the call alerting means set section 19 (S 4) to output any one of the speaker detection signal, the LED detection signal, or the LED detection signal. Further, the call information control section 7 detects the auto-reset signal outputted from the reset mode set section 20 (S 5). If the step S5 is Yes, the call information control section 7 orders the message control section 8 to output the data of the number of the times of the unread out message (S 6). The message control section 8 detects the non-read message stored in the message memory section 8 in response to the order of the data representing the number of the non-read messages received. The message control section 8 compares the contents of the non-read message stored in the register with the content of a message stored in the message memory section 9, and detects the coincidence of them. Further, the message control section 8 detects the number of times the re-receiving non-read message is received to output the data representing the number of non-read messages received to the call information control section 7 (S 7).

Upon receiving the data of the number of non-read messages received, the call information control section 7 calculates a call information time according to the equation (1) described below (S 8).

(CALL INFORMATION TIME)=(FIRST PREDETERMINED TIME)−(SECOND PREDETERMINED)×(NUMBER OF TIMES OF UNREAD OUT MESSAGE RECEIVING) (1)

As is clear from the equation (1), the call information time is set to be shorter according to an increase in the number the non-read messages received. This means that the call information time is set to be shorter in the case where the receiver is not being carried.

The call information control section 7 sets the calculated call information time to the timer 10 by means of a timer set signal. The message control section 8 outputs the information drive control signal to the assigned call information means, and outputs the message to the display section 18 (S 9).

After setting of the call information time, the timer 10 starts to count the call information time at once. At the same time, the call information means starts to excute call information, and the display section 18 starts to display the message (S 10).

After starting of the call information and the display of the message, the call information control section 7 detects the manual reset signal prior to the detection of the count-up signal (S 11). If the step S11 is Yes, the call information control section 7 resets the timer section 10 (S 12). At the same time, the message control section 8 stops to output the call information drive control signal and the message, and the call information by the call information means and the message display by the display section 10 are ceased (S 13). Further, the message control section 8 allows the message memory section 9 to store the message as the read out message in response to whether the above-mentioned re-receiving unread out message is present or not (S 13).

On the other hand, in step S 11, when the call information control section 7 fails to detect the manual reset signal, the timer section 10 counts up, and the call information control section 7 detects the count-up signal (S 15), the call information control section 7 outputs the reset signal to reset the timer section 10 (S 16). Further, at the same time, the message control section 8 stops the output of the information drive control signal and the output of the message, and the call information and displaying of the message are ceased (S 17). Further, the message control section 8 makes the memory section 9 store the message as the non-read message in response to whether the above-mentioned re-receive non-read message is present or not (S 18).

On the other hand, in step 5, in the case where the call information control section 7 detects the manual reset signal, the message control section 8 outputs the information drive control signal and the message (S 19). Hence, the call information and displaying of the message are started (S 20).

While the manual mode is selected, since the timer section 15 does not count the call information time, the call information and displaying of the message are continued, until the manual reset section 21 is operated, namely, until the call information control section 7 detects the manual reset signal (S 21).

In the case where the call information control section 7 detects the manual reset signal, the call information control section 7 stops the output of the call information drive control signal and the message, and the the call information and displaying of the message are stopped (S 22). Further, the message control section 8 make the message memory section 9 store the message as the read out message (S 23).

Next, as a second embodiment of the present invention, a call information time setting of the auto-reset which is different from that of the first embodiment will be described.

In the second embodiment, the equation (1) of the first embodiment is replaced with an equation (2) illustrated below.

$$\text{(CALL INFORMATION TIME)}=\text{(A FIRST PREDETERMINED TIME)}-\text{(THE NUMBER OF TIMES OF UNREAD OUT MESSAGE RECEIVING)}^2 \qquad (2)$$

In the equation (2), the calculating result of the call information time is as follows. If the number of times of the unread out message receiving is once, the call information time is 19 seconds. If the number of times is twice, the call information time is 16 seconds. If the number of times is three times, the call information time is 11 seconds. Namely, according to the increase in the number of the re-receiving of the unread out message, the call information time can be shortened in steps.

Therefore, the call information time can be shortened in steps as the probability that the receiver, is not being carried by a user. Hence, the receiver of the second embodiment can prolong the life of a battery. In addition, in both the first and second embodiments, if more than two bits, which represent the number of times of the re-receiving of the non-read message are used, a variable range of the information time can be widened.

Next, a third embodiment will be described. In the third embodiment, any one of the sound of a speaker, the turning on of an LED, and the vibration of a vibrator sets either a manual reset or an auto-reset. The speaker, the LED, and the vibrator serve as call information means.

Specifically, in the first embodiment, if, for example, a call means set section 19 sets the sound of the speaker and the turning on of the LED and the reset mode set section 20 sets an auto-reset, both of the speaker and the LED are designed to be auto-reset. Therefore, the sound of the speaker and the turning on of the LED are not able to be separately set either as a manual reset or auto-reset. In this way, the receiver can not be set such that the sound of the speaker is subject to manual setting, and the turning on of the LED is subject to automatic setting.

Figure 6:
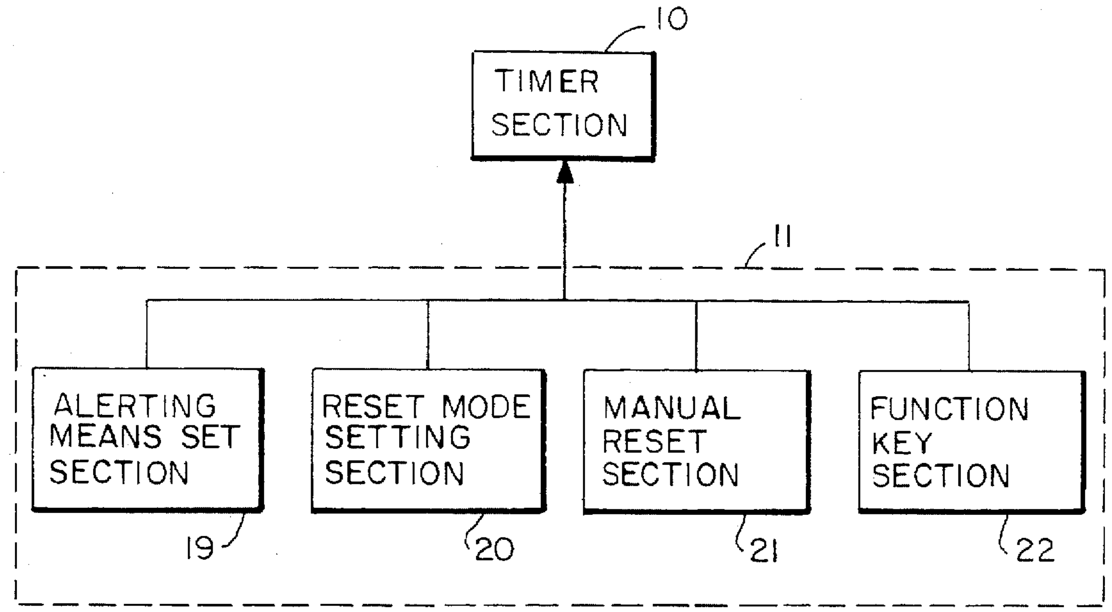
FIG. 6 is a block diagram showing an alerting set section of a third embodiment according to the present invention.

The third embodiment is proposed to solve the above drawback of the first embodiment. As shown in FIG. 6, a function key section 22 composed of switch of a push bottom type is arranged in a call information section 11, and a reset mode set section 20 is composed of a switch of the push bottom type.

Here, an operation of the third embodiment will be described from the point of view of operation procedures of the user.

First, when the function key 23 is pushed to start the call information setting, a current setting of the call information is displayed in the display section 18.

If, concerning the call information stored in the message memory section 9, the speaker 15 is set to the manual reset, the LED 16 is set to the auto-reset, and the vibrator 17 is set to the auto-reset, and if the call information set section 19 sets the speaker 15 and the LED 16, the display section 18 displays the characters illustrated as "SPEAKER MANUAL RESET" and "LED AUTO-RESET" or a simple mark. Further, the display section 18 display an cursor under the characters illustrated "SPEAKER MANUAL RESET".

When a user operates the function key 22 based on the display of the display section 18, the cursor is moved to the right by one index by pushing the function key 22. After the cursor is moved to the right extreme, cursor moves to the left by one index with one pushing. For example, when the cursor exists under the sentence illustrated as "SPEAKER MANUAL RESET", if the user pushes the function key section 22, the cursor changes its position from "SPEAKER MANUAL RESET" to "LED AUTO-RESET".

Further, when the cursor is located under "LED AUTO-RESET", the manual reset section 21 is operated, the reset mode of the LED 16 is changed to switch the display of the display section 18 from "LED AUTO-RESET" to "LED MANUAL RESET".

By adopting the above, the user can change the reset mode of the call information means. When the user pushes the reset mode set section 20, the setting of the call information is ended.

In addition, at the end of the setting, the display of the display section 18 is stopped, and the result of the setting is stored in the message memory section 9. Thereafter, the call information is done based on this stored call information setting.

Note that, at the start of the call information setting, when the call information setting read out from the message memory section 9 is as to only the speaker 15 and the LED 16, and the call means setting section 19 is setting the speaker 15, the LED 16, and the vibrator 17, the display section 18 displays "VIBRATOR MANUAL RESET"

Figure 7:
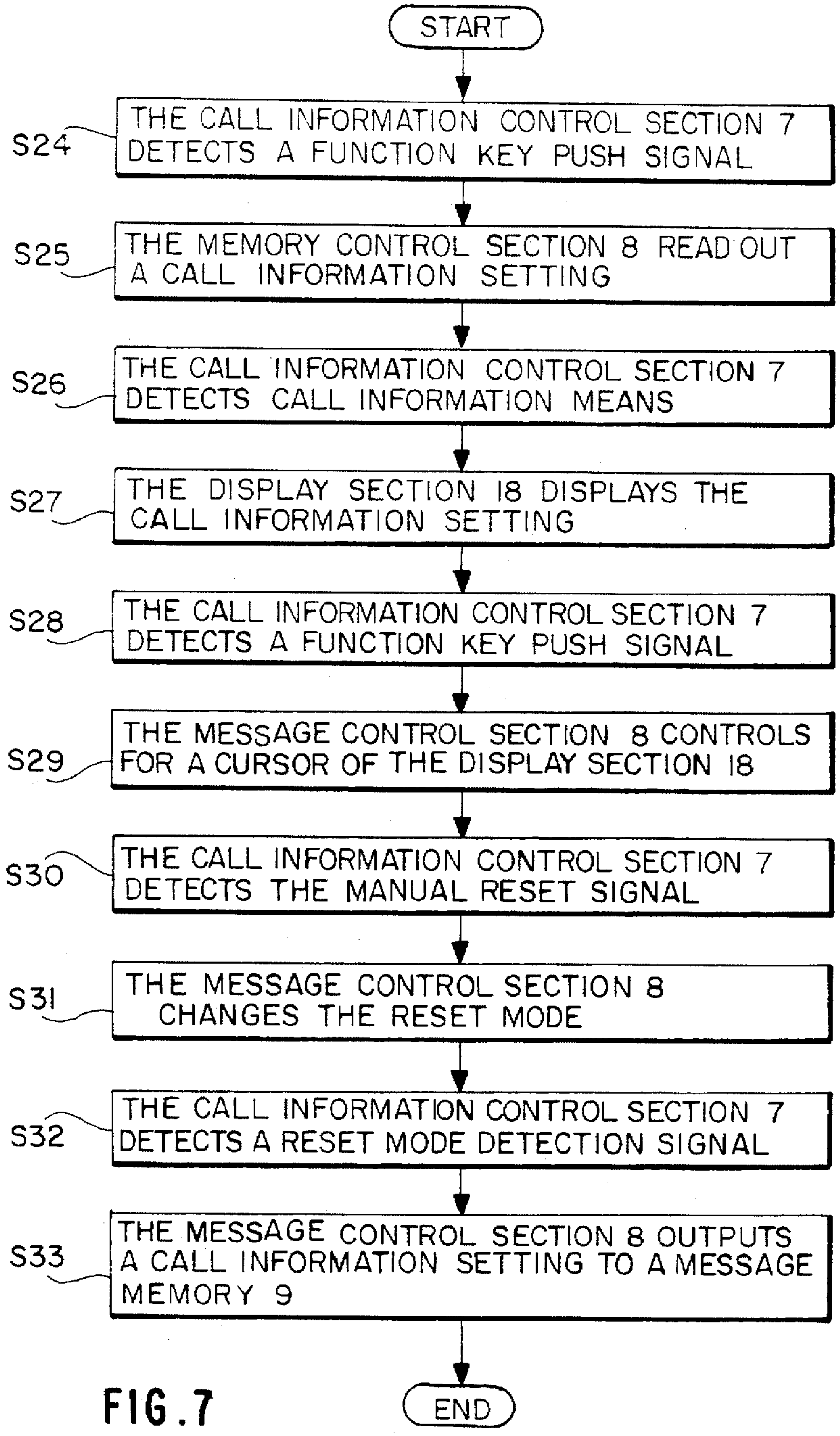
FIG. 7 is a flow chart for illustrating an operation of a third embodiment.

Next, an operation of the third embodiment of the present invention from the view point of the receiver, i.e., an operation of the control section 6, will be described with reference to FIG. 7 below.

First, when the function key section 23 is pushed, the call information control section 7 detects a function key push signal (S 24). Hence, the message control section 8 stores the function key push signal in the register, and detects the start of the call information setting.

After the message control section 8 stores the function key pushing signal in the register, the message control section 8 read out the call information setting stored in the message memory section 9 (S 25). The call information control section 7 detects the setting content of the call information means set by the call means setting section 19 (S 26).

The message control section 8 controls the display operation of the display section 18 based on the call information setting read out from the message memory section 9 and the detected signal outputted from the call means set section 19 (S 27).

When the function key section 22 is operated to make the cursor move, the call information control section 7 detects the function key push signal (S 28). At this time, since the function key push signal has been already stored in the register, the message control section 8 judges the detected function key push signal as an order to move the cursor so that the message control section 8 controls the display section 18 so as to move the cursor (S 29).

When the manual reset section 21 is pushed to change the setting of the reset mode, the call information control section 7 detects a manual reset detection signal (S 30). At this time, since the function key push signal has been already stored in the register, the message control section 8 judges the manual reset signal inputted thereto as an order for changing the reset mode setting. The message control section 8 controls the display section 18 so as to change the reset mode of the call information means represented by the current position of the cursor, and stores the reset mode in the register (S 31).

When the reset mode set section 20 is pushed to terminate the call information setting, the call information control section 7 detects a reset mode detection signal (S 32). Since the function key push signal has been already stored in the register, the message control section 8 judges the detected reset mode detection signal as an order of a terminal of the call information setting. Then, the message control section 8 erases the function key push signal, and further makes the message memory section 9 store a call information already set which is stored in the register (S 36), to terminate the call information setting.

Next, a fourth embodiment of the present invention will be described below.

In the first embodiment, the call information time at the time of auto-reset is calculated based on the number of times of the re-receiving of the non-read message. However, in the fourth embodiment, the call information time is calculated based on the number of the uninformed calling.

In the first embodiment, the calling information time is calculated based on the coincidence of a content of message between the non-read out message stored in the message memory section 9 and the message stored in the register.

On the other hand, in the fourth embodiment, the information calling time does not depend on the coincidence of the content of both of the messages.

Therefore, in the fourth embodiment, the non-read out message stored in the message memory section 9 has the structure such that only one bit is added to the starting bit, namely, the bit representing either the non-read out message or the read out message.

Further, when the data representing the number of times of the non-read out message is outputted, the message control section 8 researches the starting bit of the message stored in the message memory section 9 to detect the number of the non-read messages without the coincidence of contents of them, thereby outputting data representing of the number of uninformed calls.

Further, when the message control section 8 inputs the count-up signal, the message control section 8 sets logical state "1" to the starting bit of the message stored in the register, and makes the message memory section 9 store it as the unread out message. On the other hand, when the message control section 8 inputs the manual reset detection signal, the message control section 8 sets logical state "0" to the starting bit of the message stored in the register, and makes the message memory section 9 it as the read out message.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A selective calling receiver having an alerting time auto-control function comprising:

first storing means for storing an identification number;

decoder means for detecting a coincidence of a call signal contained in a received signal and said identification number to output a coincidence signal, and for decoding a message signal contained in said received signal to output a message;

alerting means responsive to said coincidence signal for executing an alerting signal;

second storing means for storing a non-read message and a read out message;

display means for displaying said message;

calculating means for calculating an alerting time based on the number of said non-read message;

alerting stopping means for stopping said executing of the alerting signal and said display of the message when said alerting time is counted up; and changing means for changing said message to a non-read message.

2. A selective calling receiver claimed in claim 1, wherein said calculating means calculates said alerting time so as to be shortened accompanying with an increase in the number of said non-read message.

3. A selective calling receiver claimed in claim 2, wherein said calculating means comprises:

multiplyer means for multiplying the number of said non-read message by a predetermined first time; and subtractor means for subtracting the multiplying result from a predetermined second time.

4. A selective calling receiver claimed in claim 2, wherein said calculating means comprises:

square means for squaring said non-read message, and subtractor means for subtracting, the squaring result from a predetermined time.

5. A selective calling receiver claimed in claim 1, wherein said alerting means comprises:

a speaker, a light emitting element, and a vibrator;

and said receiver further comprises:

selecting means for selecting any one of said speaker, said light emitting element, and said vibrator, and for making them excute said alerting.

6. A selective calling receiver claimed in claim 1, said receiver further comprising:

manual reset means for making said execution of the alerting stop only by manipulation by said user.

7. A selective calling receiver having an alerting time auto-control function comprising:

an antenna;

radio means for demodulating and amplifying the received signal by the antenna and for outputting the demodulated signal;

wave shaping means for shaping the wave form of said demodulated signal and for outputting a digital signal;

first storing means for storing an identification number;

decoder means for detecting a coincidence of a call signal contained in said digital signal and said identification number to output a coincidence signal, and for decoding a message signal contained in said digital signal to output a message;

alerting means for inputting said coincidence signal to execute an alerting signal;

display means for displaying said message;

second storing means for storing a non-read message and a read out message, said non-read message having the means for indicating the number of times of receipt of said non-read message;

reset means for operation by a user of said receiver when said user notices said alerting, and for outputting a reset signal;

output means for outputting said number of times of receipt of said non-read message coinciding with the content of said message from said memory means;

calculating means for calculating an alerting time based on said number of times of receipt of said non-read message;

counting means for counting said alerting time, and for outputting a count up signal when said alerting time is counted up;

alerting stopping means for stopping said alerting signal and displaying said message when said reset signal or count up signal is inputted;

first converting means for incrementing said number of times of receiving said non-read message by one, which is coincident with said message when said count up signal is input thereto, and outputting said non-read message to said second memory means;

second converting means for converting a non-read message coinciding with said message to a read out message, when said reset signal is input thereto, and outputting said read out message to said second memory means;

third converting means for converting said message to a non-read message, when said output means fails to detect a coincidence of said message, and when said count up signal is inputted, thereto, and outputting said non-read message to said second memory means; and fourth converting means for converting said message to a read out message, when said output means fails to detect a coincidence of said message, and when said reset signal is inputted thereto, and outputting said read out message to said second memory means.

8. A selective calling receiver claimed in claim 7, wherein said calculating means calculates said alerting time so as to be shortened in conjunction with an increase in said number of times of receipt of said non-read message.

9. A selective calling receiver claimed in claim 8, wherein said calculating means comprises:

multiplying means for multiplying said number of times of receipt of said non-read message by a predetermined first time, and subtracting means for subtracting the multiplying result from a predetermined second time.

10. A selective calling receiver claimed in claim 8, wherein said calculating means comprises:

squaring means for squaring said number of times of receiving of said none-read message; and subtracting means for subtracting the squaring result from a predetermined time.

11. A selective calling receiver claimed in claim 7, wherein said alerting means comprises:

a speaker, a light emitting element, and a vibrator;

and said receiver further comprises:

selecting means for selecting any one of said speaker, said light emitting element, and said vibrator, and for making them said alerting.

12. A selective calling receiver claimed in claim 7, said receiver further comprises:

manual reset means for excuting the alerting stop only by manipulation of said reset means.

13. A selective calling receiver having an alerting time auto-control function comprising:

an antenna;

radio means for demodulating and amplifying the received signal by the antenna and for outputting the demodulated signal;

wave shaping means for shaping the wave form of said demodulated signal and for outputting a digital signal;

first stopping means for storing an identification number;

decoder means for detecting a coincidence of a call signal contained in said digital signal and said identification signal, for outputting a coincidence signal, and for decoding a message signal contained in said digital signal, for outputting a message;

a plurality of alerting means for inputting said coincidence signal and a selection signal, and outputting an alerting signal;

second storing means for storing a non-read message and a read out message;

display means for displaying said read out message;

reset means for operation by a user of said receiver when said user notices said alerting signal, and for outputting a reset signal;

alerting selection means for selecting any one of the plurality of said alerting means, and for setting one of an auto-reset which automatically stops said alerting signal, and for setting one of a manual reset which stops said alerting signal only by inputting said reset signal before inputting a count up signal, and for outputting said selection signal;

calculating means for calculating said alerting time based on the number of said non-read message;

counting means for counting said alerting time, and for outputting said count up signal when said call information time is counted up;

alerting stopping means for inputting said reset signal or said count up signal, and for stopping said alerting signal and displaying said message; and changing means for changing said message to a non-read message upon inputting said count-up signal, and for changing said message to a read out message upon inputting said reset signal, and for outputting them to said second memory means.

14. A selective calling receiver claimed in claim 13, said receiver further comprising:

third memory means for storing said selection signal: and said alerting selection means includes:

reading means for reading out said selection signal from said third memory means;

setting means for setting any one of an auto-reset and a manual reset to one of said plurality of alerting means selected by said alerting selection means; and storing means for storing the selection set by said setting means.

15. A selective calling receiver claimed in claim 14, wherein said calculating means calculates said alerting time so as to be shortened in conjunction with an increase in the number of said non-read message.

16. A selective calling receiver claimed in claim 15, wherein said calculating means comprises:

multiplying means for multiplying said number of said non-read message by a predetermined first time; and subtracting means for subtracting the multiplying result from a predetermined second time.

17. A selective calling receiver claimed in claim 15, wherein said calculating means comprises:

square means for squaring said number of the non-read message, and subtract means for subtracting the squaring result from a predetermine time.

18. A selective calling receiving claimed in claim 14, said plurality of alerting means comprises:

a speaker;

a light emitting element; and a vibrator.

19. An alerting method of a selective calling receiver having an alerting time auto-control function comprising the steps of:

selecting any one of a plurality of alerting means for alerting;

setting one of an auto-reset which automatically stops said alerting and a manual reset which stops said alerting only by an operation of a user;

detecting a coincidence of a call signal contained in a radio signal and an identification number;

calculating a predetermined alerting time based on the number of uniformed calls;

counting said uninformed calls and calculating a result;

alerting by said plurality of call alerting means at the time of said alerting time;

stopping said alerting by said operation by the user or counting up of said alerting time;

incrementing the number of said uninformed calls by one at the counting up of the alerting time.

20. A selective calling receiver having an alerting time auto-control function comprising:

first storing means for storing an identification number;

decoder means for detecting a coincidence of a call signal contained in a received signal and said identification number, and outputting a coincidence signal;

alerting means for inputting said coincidence signal, and for alerting;

second storing means for storing the number of uninformed calls;

calculating means for calculating an alerting time based on said number of uninformed calls;

alerting stopping means for stopping said alerting when said alerting time is counted up; and changing means for incrementing said number of said uninformed calls.

21. A selective calling receiver claimed in claim 20, wherein said calculating means calculates said alerting time so as to be shortened in conjunction with an increase in said number of said uninformed calls.

22. A selective calling receiver claimed in claim 21, wherein said calculating means comprises:

multiplying means for multiplying said number of said uninformed calls by a predetermined first time; and subtracting means for subtracting the multiplying result from a predetermined second time.

23. A selective calling receiver claimed in claim 21, wherein said calculating means comprises:

squaring means for squaring of said number of the uninformed calling; and subtract means for subtracting the squaring result from a predetermined second time.

24. A selective calling receiver claimed in claim 20, wherein said alerting means comprises:

a speaker, a light emitting element, and a vibrator;

and said receiver further comprises:

selection means for selecting any one of said speaker, said light emitting element, and said vibrator, and for making them operate said alerting.

25. A selective calling receiver claimed in claim 20, said receiver further comprising:

manual reset means for stopping said alerting only by operation by said user.

* * * * *

UNITED STATES PATENT AND TRADEMARK OFFICE
CERTIFICATE OF CORRECTION

PATENT NO. : 5,739,764
DATED : April 14, 1998
INVENTOR(S) : Motoki IDE, et al

It is certified that error(s) appears in the above-identified patent and that said Letters Patent is hereby corrected as shown below:

Column 3, line 51 delete "falls" and insert --fails--.
line 55 after "section" insert --10--.
Column 5, line 11 delete "out".

Signed and Sealed this

Twenty-second Day of September, 1998

Attest:

BRUCE LEHMAN

*Attesting Officer* *Commissioner of Patents and Trademarks*